(12) United States Patent
Hwang et al.

(10) Patent No.: US 10,515,573 B2
(45) Date of Patent: Dec. 24, 2019

(54) HEAD MOUNTED DISPLAY AND METHOD FOR CONTROLLING THE SAME

(71) Applicant: LG DISPLAY CO., LTD., Seoul (KR)

(72) Inventors: Gunwoo Hwang, Seoul (KR); Sanglyn Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 62 days.

(21) Appl. No.: 15/842,681

(22) Filed: Dec. 14, 2017

(65) Prior Publication Data

US 2018/0182273 A1    Jun. 28, 2018

(30) Foreign Application Priority Data

Dec. 26, 2016    (KR) ........................ 10-2016-0178860

(51) Int. Cl.
| | |
|---|---|
| *G09G 5/00* | (2006.01) |
| *G09G 3/00* | (2006.01) |
| *G06F 3/01* | (2006.01) |
| *G02B 27/01* | (2006.01) |
| *G09G 3/20* | (2006.01) |
| *G06F 1/16* | (2006.01) |

(52) U.S. Cl.
CPC ......... *G09G 3/002* (2013.01); *G02B 27/0172* (2013.01); *G06F 1/163* (2013.01); *G06F 3/011* (2013.01); *G06F 3/012* (2013.01); *G09G 3/001* (2013.01); *G09G 3/2096* (2013.01); *G02B 2027/011* (2013.01); *G02B 2027/014* (2013.01); *G02B 2027/0141* (2013.01); *G09G 2310/0286* (2013.01); *G09G 2310/0289* (2013.01); *G09G 2310/08* (2013.01); *G09G 2320/028* (2013.01); *G09G 2320/0261* (2013.01); *G09G 2340/14* (2013.01); *G09G 2354/00* (2013.01)

(58) Field of Classification Search
CPC ................................. G06F 3/011; G06F 3/012
See application file for complete search history.

(56) References Cited

U.S. PATENT DOCUMENTS

| | | | |
|---|---|---|---|
| 5,933,125 | A | 8/1999 | Fernie et al. |
| 2005/0156817 | A1 | 7/2005 | Iba |
| 2010/0026714 | A1 | 2/2010 | Utagawa |
| 2010/0165002 | A1 | 7/2010 | Ahn |

(Continued)

FOREIGN PATENT DOCUMENTS

| | | |
|---|---|---|
| JP | 2004-109994 A | 4/2004 |
| JP | 2006323255 A | 11/2006 |

(Continued)

*Primary Examiner* — Nan-Ying Yang
(74) *Attorney, Agent, or Firm* — Seed Intellectual Property Law Group LLP

(57) ABSTRACT

A head mounted display (HMD) may include: a sensor configured to measure a motion of the HMD; a controller configured to generate image data based on first sensing information measured by the sensing unit at a first time point; and a display device configured to frame-shift the generated image data, and output the frame-shifted image data to a display panel. The display device may frame-shift the image data using second sensing information measured by the sensor at a second time point after the first time point, and the second time point may correspond to a time point immediately before the controller outputs the image data to the display panel after generating the image data.

16 Claims, 13 Drawing Sheets

(56) References Cited

U.S. PATENT DOCUMENTS

| | | | |
|---|---|---|---|
| 2011/0248904 A1 | 10/2011 | Miyawaki et al. | |
| 2013/0326364 A1* | 12/2013 | Latta | G06F 3/012 |
| | | | 715/751 |
| 2014/0248950 A1* | 9/2014 | Tosas Bautista | G06F 3/01 |
| | | | 463/31 |
| 2014/0361956 A1* | 12/2014 | Mikhailov | G02B 27/0179 |
| | | | 345/8 |
| 2015/0029218 A1 | 1/2015 | Williams et al. | |
| 2016/0189429 A1 | 6/2016 | Mallinson | |
| 2016/0267877 A1* | 9/2016 | Patel | G09G 3/2014 |
| 2017/0203172 A1* | 7/2017 | Ito | A63B 69/36 |
| 2017/0343823 A1* | 11/2017 | Tagawa | G09G 5/00 |

FOREIGN PATENT DOCUMENTS

| | | |
|---|---|---|
| JP | 2007213407 A | 8/2007 |
| JP | 2014-16627 A | 1/2014 |
| WO | 2013/167901 A1 | 11/2013 |

\* cited by examiner

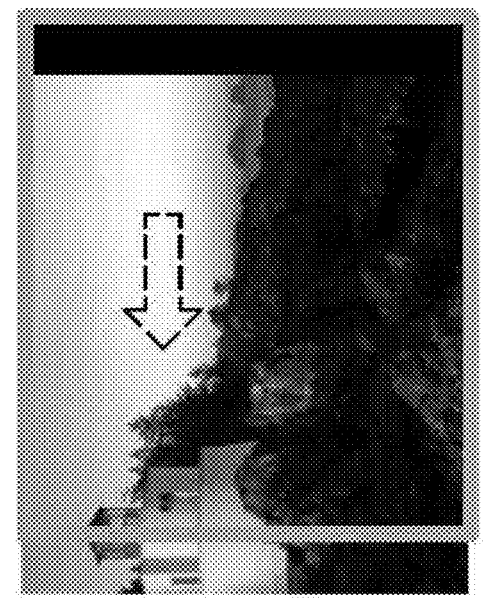
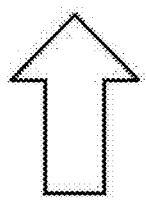
FIG. 10
<A>
<B>

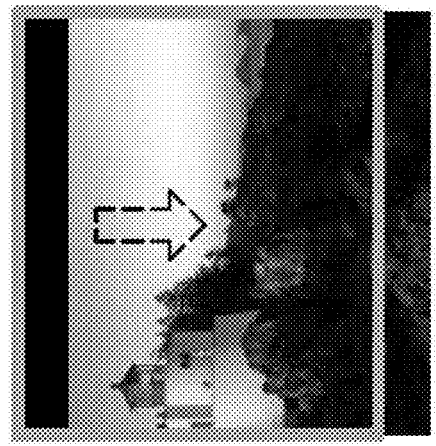
<B>
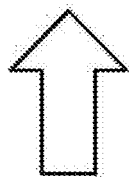
<A>
FIG. 12

FIG. 13
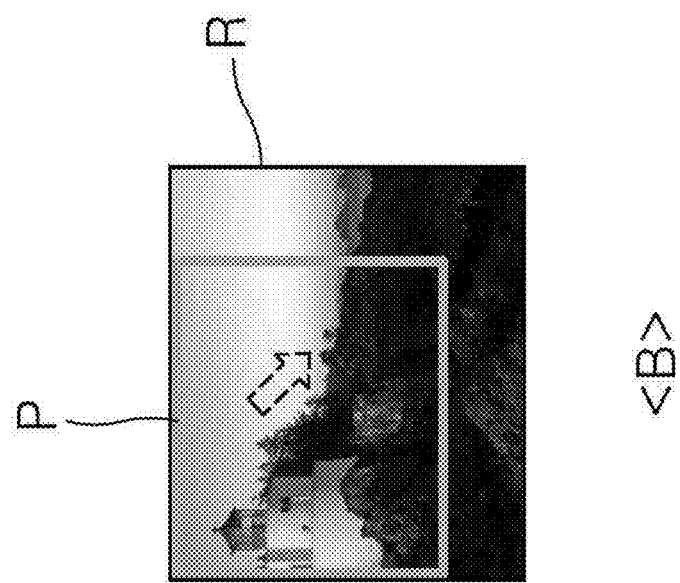
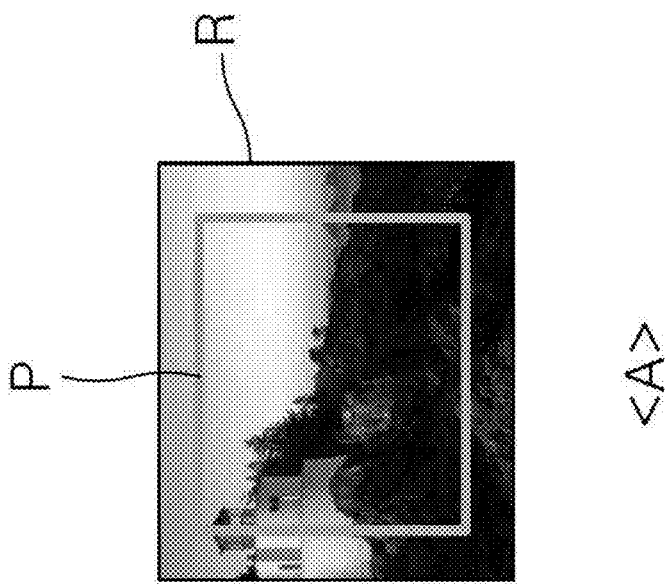

HEAD MOUNTED DISPLAY AND METHOD FOR CONTROLLING THE SAME

CROSS-REFERENCE TO RELATED APPLICATION

This application claims the benefit of Korean Patent Application No. 10-2016-0178860, filed on Dec. 26, 2016 in the Korean Intellectual Property Office, the disclosure of which is incorporated herein by reference.

BACKGROUND

Technical Field

The present disclosure relates to a head mounted display (HMD) and a method for controlling the same, and more particularly, to an HMD which is capable of reducing a motion-to-motion latency required until an image is actually outputted to a display from a time point that a motion of the HMD is sensed, and a method for controlling the same.

Description of the Related Art

Recently, with the development of the information technology (IT), a head mounted display (HMD) has emerged as a big issue in daily life. In particular, the HMD may be connected to various programs and applications, and utilized as a communication tool that performs necessary functions in daily life.

Virtual reality (VR) represents the technology that provides real-life experiences through intercommunications between a human sensory system and a virtual space constructed through a computer, and refers to a virtual situation or environment created through a computer. The created virtual environment or situation stimulates a user's sense and enables the user to have spatial and temporal experience similar to real life, thereby allowing the user to feel as if the experiences were actually occurring in reality.

When VR devices are used, the VR devices can allow a user to feel that the VR is more real. Thus, the user can be immersed in the VR world while easily crossing the line between the real life and the virtual space. Furthermore, the VR devices may operate as units for controlling motions and experiences of a user in the VR world. Since the VR devices can interact with objects in the VR world, each user may have a different experience.

The VR includes a concept of presence indicating that an object appears before a user's eyes. The presence provides high immersion to cause the user to believe that the user is present in a non-physical world which is virtually constructed. When an experience of the presence is formed, a motion-to-motion latency may occur.

The motion-to-motion latency represents a time required until a user's motion is reflected into the actual screen such that photons reach the user's eyes, from the moment that the user started the motion. In other words, the motion-to-motion latency refers to a time difference between a user's eye movement and the corresponding screen update. Minimizing the motion-to-motion latency is an important factor for providing a comfortable VR environment.

In general, when the motion-to-motion latency is equal to or less than 20 ms, a user does not recognize the motion-to-motion latency.

However, when the motion-to-motion latency is increased to 50 ms or more, for example, the user may feel simulator sickness or "sim sickness" while executing a VR program with an HMD worn on the head. Furthermore, when the motion-to-motion latency is increased, the response of the HMD to the user's motion may be degraded.

BRIEF SUMMARY

Various embodiments are directed to an HMD which is capable of minimizing or reducing a motion-to-motion latency for a screen output, thereby minimizing or reducing a sense of unnaturalness and sim sickness, and a method for controlling the same.

Also, various embodiments are directed to an HMD which is capable of shifting a data application signal to determine an output timing of image data inputted to a display, using pixel shift information calculated through multiple pieces of sensing information, thereby frame-shifting image data outputted to a display panel, and a method for controlling the same.

Other objects and advantages of the present disclosure can be understood by the following description, and will become apparent with reference to the embodiments of the present disclosure. Also, it will be readily appreciated by those skilled in the art to which the present disclosure pertains that the objects and advantages of the present disclosure can be realized by the various embodiments as claimed and combinations thereof.

As the number of image data is increased, the motion-to-motion latency of the conventional HMD may be increased to 50 ms or more, for example, the response of an image to a motion may be degraded, and a user may feel sim sickness.

In an embodiment, an HMD may include: a sensor configured to measure a motion of the HMD; a controller configured to generate image data based on first sensing information measured by the sensing unit at a first time point; and a display device configured to frame-shift the generated image data, and output the frame-shifted image data to a display panel. The display device may frame-shift the image data using second sensing information measured by the sensor at a second time point after the first time point, and the second time point may correspond to a time point immediately before the controller outputs the image data to the display panel after generating the image data.

The display device may include: a first image processing unit configured to remove distortion contained in the input image data, based on lens correction information; a frame shifting unit configured to generate a signal for frame-shifting the image data outputted from the first image processing unit, based on pixel shift information; and a second image processing unit configured to apply distortion to the image data outputted from the frame shifting unit, based on the lens correction information.

The display device may include: a complementary filter configured to convert the sensing information inputted from the sensor into an Euler angle; and an angle-pixel conversion unit configured to calculate the pixel shift information using the Euler angle.

The frame shifting unit may frame-shift the position of the image data outputted to the display panel, using a vector value of the pixel shift information which is calculated based on the first and second sensing information.

The display panel may include data lines and gate lines which cross each other, and the display device may include: a data driver configured to convert the input image data into data voltages and output the data voltages to the data lines; a gate driver configured to sequentially output gate pulses synchronized with the data voltages to the gate lines; and a timing controller configured to compensate for the image data inputted to the data driver, and control an output timing. The timing controller may frame-shift the image data outputted to the display panel by shifting a data application signal that decides the output timing of the image data inputted to the data driver.

When the data application signal is shifted within a unit clock of the image data inputted to the data driver, the image data outputted to the display panel may be frame-shifted to the left or right.

When the data application signal is shifted by one or more unit clocks of the image data inputted to the data driver, the image data outputted to the display panel may be frame-shifted upward or downward.

A time interval between the second time point and the first time point may be equal to a time required for the controller to generate one image frame based on the first sensing information.

In another embodiment, a method for control an HMD may include: measuring a motion of the HMD at a first time point; generating image data based on first sensing information measured at the first time point; measuring a motion of the HMD at a second time point after the first time point; frame-shifting the image data generated through the first sensing information, based on second sensing information measured at the second time point; and outputting the frame-shifted image data to a display panel. The second time point may correspond to a time point immediately before the image data is outputted to the display panel after the image data was generated.

The frame-shifting of the image data generated through the first sensing information may include: removing distortion contained in the input image data based on lens correction information; frame-shifting the image data from which the distortion is removed, based on pixel shift information; and applying distortion to the frame-shifted image data based on the lens correction information.

The frame-shifting of the image data generated through the first sensing information may further include: converting the first and second sensing information into an Euler angle; and calculating the pixel shift information using the Euler angle.

The frame-shifting of the image data based on the pixel shift information may include frame-shifting the position of the image data outputted to the display panel using a vector value of the pixel shift information which is calculated based on the first and second sensing information.

The display panel may include data lines and gate lines which cross each other, and the outputting of the frame-shifted image data to the display panel may include: converting the input image data into data voltages and outputting the data voltages to the data lines; sequentially outputting gate pulses synchronized with the data voltages to the gate lines; and compensating for the image data, and controlling an output timing. The controlling of the output timing may include frame-shifting the image data outputted to the display panel by shifting a data application signal that decides the output timing of the input image data.

When the data application signal is shifted within a unit clock of the input image data, the image data outputted to the display panel may be frame-shifted to the left or right.

When the data application signal is shifted by one or more unit clocks of the input image data, the image data outputted to the display panel may be frame-shifted upward or downward.

A time interval between the second time point and the first time point may be equal to a time required for generating one image frame based on the first sensing information.

BRIEF DESCRIPTION OF THE SEVERAL VIEWS OF THE DRAWINGS

FIGS. 9 and 10 are a timing diagram and a photograph, respectively, for describing the operation of HMD according to the embodiment of the present disclosure.

FIGS. 11 and 12 are a timing diagram and a photograph, respectively, for describing an operation of an HMD according to another embodiment of the present disclosure.

FIG. 13 is photographs for describing an operation of an HMD according to still another embodiment of the present disclosure.

DETAILED DESCRIPTION

Figure 1:
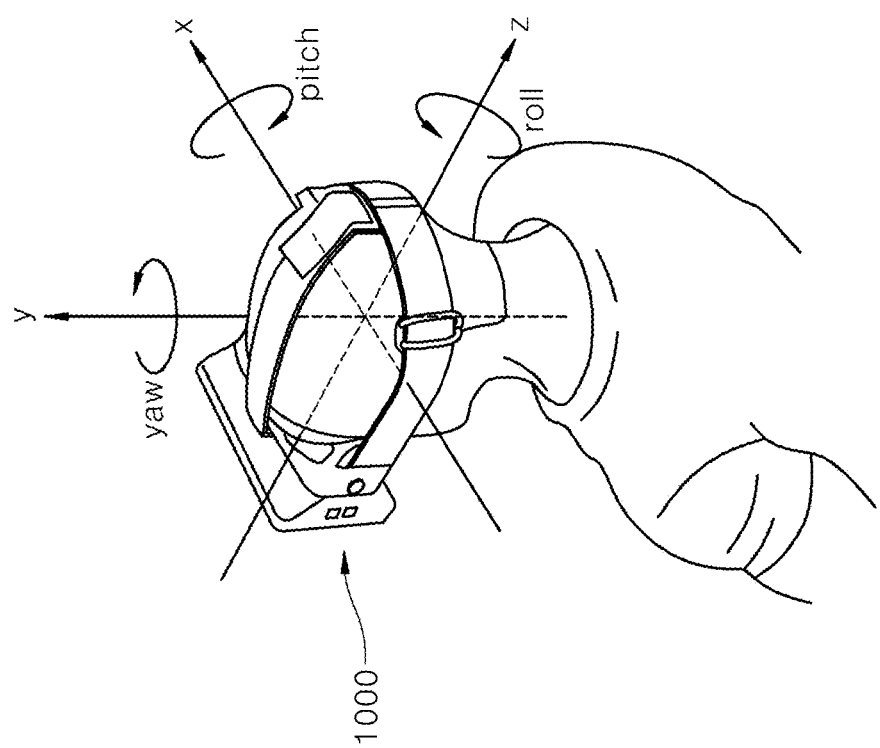
FIG. 1 is a perspective view illustrating a motion of a user wearing a head mounted display (HMD).

The above-described objects and advantages will be described in detail with reference to the accompanying drawings, such that the technical idea of the present disclosure can easily be carried out by a person with ordinary skill in the art to which the disclosure pertains. Moreover, detailed descriptions related to well-known functions or configurations will be ruled out in order not to unnecessarily obscure subject matters of the present disclosure. Hereafter, exemplary embodiments of the present disclosure will be described with reference to the accompanying drawings. Throughout the drawings, like reference numerals represent the same or similar components.

Hereafter, an HMD and a method for controlling the same according to embodiments of the present disclosure will be described with reference to the accompanying drawings.

FIG. 1 is a perspective view illustrating a motion of a user wearing an HMD.

Referring to FIG. 1, the HMD 1000 may be fixed to the user's head, worn over the user's eyes, and display two different images.

The head center of the user is positioned at the three-dimensional (3D) center point of pitch, yaw and roll axes. In the 3D coordinate system, a pitch indicates an x-axis rotation, a yaw indicates a y-axis rotation, and a roll indicates a z-axis rotation.

A motion of the HMD 1000 worn by the user can be expressed by the pitch, yaw and roll.

Figure 2:
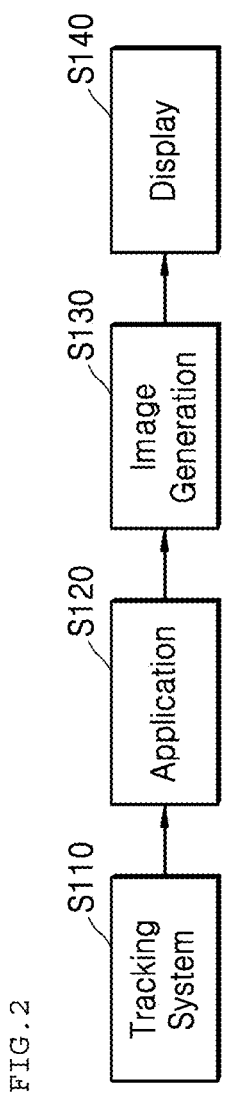
FIG. 2 is a block diagram illustrating an image display method of a conventional HMD.

FIG. 2 is a block diagram illustrating an image display method of a conventional HMD.

Referring to FIG. 2, the conventional HMD calculates an angle by which the user has moved along the user's eyes in a 3D virtual space, and displays the corresponding image.

When the user's head is moved, the HMD acquires orientation information on the motion, using a plurality of sensors included in a tracking system embedded therein, at step S110. At this time, a sensor embedded in the tracking system may include a gyroscope, an acceleration sensor, a magnetic sensor, one or more video cameras, color sensors, and may be composed of a motion sensor, a position sensor and orientation sensors.

Then, a controller of the HMD performs an operation according to an application executed in the HMD, at step S120. The application may include an operating system or application program. For example, the controller may calculate movement information based on data measured by the sensor, the movement information containing an angle by which the user has moved. However, the present disclosure is not limited thereto.

Then, the controller of the HMD generates an image corresponding to a direction seen by the user in real time at step S130. For example, the controller may generate a new image based on the movement information.

Then, the controller outputs the generated image to a screen at step S140.

In general, the HMD requires a predetermined time until the HMD can display an image corresponding to a user's motion on the screen, after acquiring the user's motion from the sensor. Hereafter, the predetermined time is referred to as motion-to-motion latency.

When the motion-to-motion latency is equal to or less than 20 ms, the user does not recognize the latency. However, the conventional HMD has a motion-to-motion latency of 50 ms or more, and the motion-to-motion latency may be further increased depending on the complexity of an application.

When the motion-to-motion latency is increased to 50 ms or more, for example, the user may feel a sense of unnaturalness and disharmony in an image, while executing a VR program with the HMD worn on the head of the user. In a worse case, the user may feel sim sickness.

Figure 3:
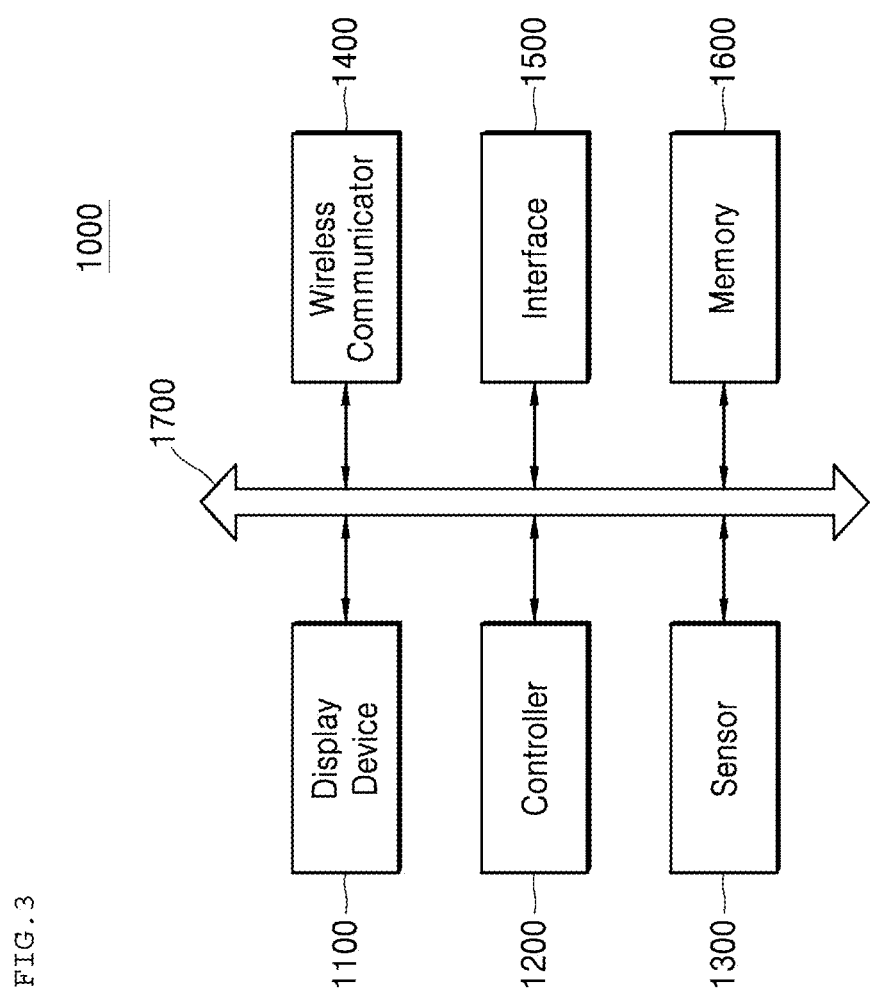
FIG. 3 is a block diagram illustrating an HMD according to various embodiments of the present disclosure.

FIG. 3 is a block diagram illustrating an HMD according to various embodiments of the present disclosure.

Referring to FIG. 3, the HMD 1000 according to the embodiments of the present disclosure includes a display device 1100, a controller 1200, a sensor 1300, a wireless communicator 1400, an interface 1500, a memory 1600 and a bus 1700.

Figure 4:
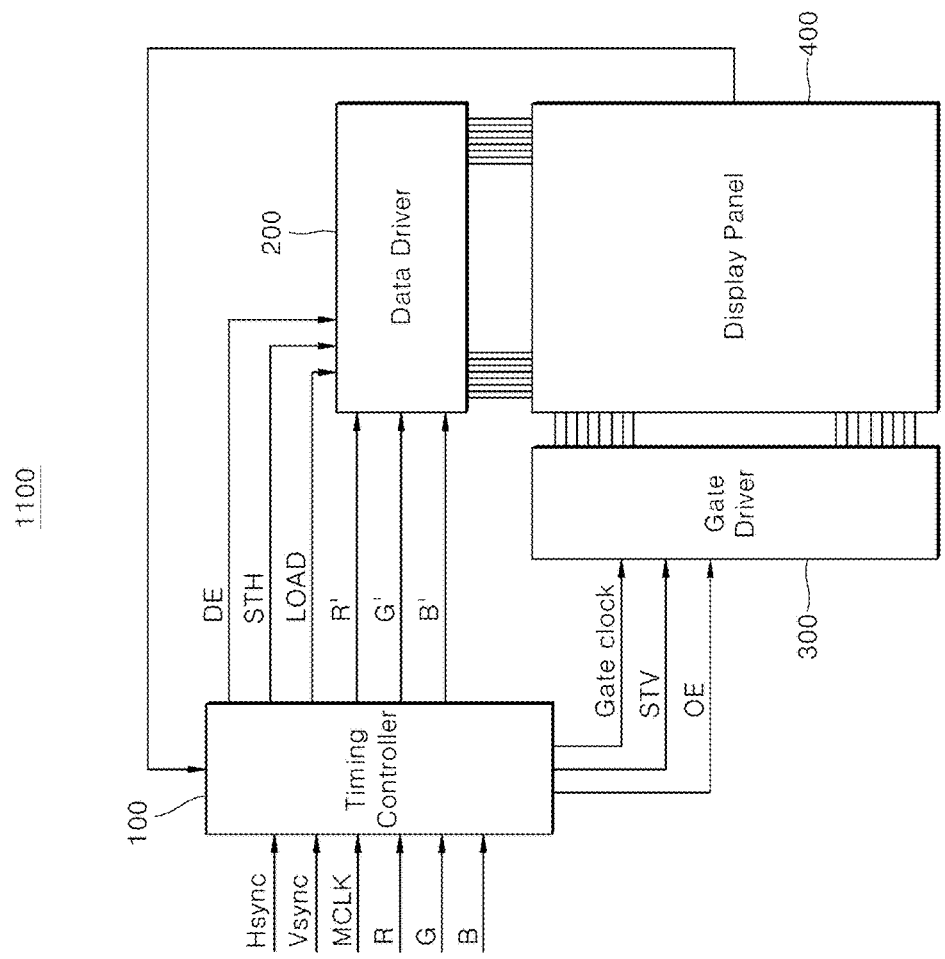
FIG. 4 is a block diagram illustrating components of a display device of the HMD of FIG. 3.

The display device 1100 displays processed image data on a display panel 400 of FIG. 4 according to a control command from the controller 1200.

The display device 1100 may frame-shift image data which are generated based on first sensing information measured by the sensor 1300 at a first time point, using second sensing information measured by the sensor 1300 at a second time point. At this time, the second time point corresponds to a time point immediately before the controller 1200 outputs the image data to the display panel 400 after generating the image data at the first time point.

At this time, a time interval between the second time point and the first time point may be equal to a time required for the controller 1200 to generate one image frame based on the first sensing information. However, the present disclosure is not limited thereto, and this configuration will be described in more detail.

The display panel 400 of FIG. 4 may be composed of one or more display panels. For example, the display panel 400 may be located before the very eyes of the user wearing the HMD. In this case, the display panel 400 can display an image using a lower resolution than when displaying the same image on a remote screen.

The controller 1200 may control operations of all the components of the HMD 1000.

Specifically, the controller 1200 calculates position information of the HMD 1000 based on data measured by the sensor 1300, and generates new image data based on the position information. The generated image data may be transmitted to the display device 1100. The controller 1200 may include a central processing unit (CPU) and a graphic processing unit (GPU).

The operation of generating new image data may include rendering and scene shift operations. The rendering indicates changing one or more of the shadow, color and concentration of an image included in a frame. The frame indicates one screen of each of images in which motions of a scene are consecutively displayed while a video is played by video frames.

The sensor 1300 senses a motion of the HMD 1000.

The sensor 1300 includes sensors for generating motion, position and orientation data. The sensor 1300 may include one or more of a gyroscope, an acceleration sensor, a magnetic sensor, one or more video cameras, color sensors, and may be composed of a motion sensor, a position sensor and orientation sensors. The orientation indicates a direction vector in a 3D space where a user wearing the HMD 1000 looks at things.

The sensor 1300 may be operated at a relatively high frequency band, in order to provide sensor data at a high ratio. For example, the sensor data may be generated at a ratio of 1,000 Hz. Alternatively, the sensor 1300 may perform sensing at every one-millionth second. In this way, several thousand sensor data may be generated per second. However, the present disclosure is not limited thereto.

The wireless communicator 1400 may perform a function of transmitting data to a communication network or receiving data from the communication network. The wireless communicator 1400 transmits and receives data using a protocol. For example, the wireless communicator 1400 may wirelessly exchange data with a user controller or external sensor which is operated in connection with the HMD 1000.

The interface 1500 may receive an input of the user. The interface 1500 may receive a command of the user using a plurality of buttons, an infrared sensor, a kinetic sensor and the like. However, the present disclosure is not limited thereto.

The memory 1600 stores image data generated by the controller 1200. Furthermore, the memory 1600 may store sensing data measured by the sensor 1300 and lens correction information associated with a lens included in the display device 1100, and provide the sensing data and the lens correction information to the controller 1200 or the display device 1100.

The memory 1600 may include a volatile or nonvolatile memory. The memory 1600 may operate as a buffer that temporarily stores the generated image data.

The bus 1700 may be used for data communication which is performed among the display device 1100, the controller 1200, the sensor 1300, the wireless communicator 1400, the interface 1500 and the memory 1600. In the embodiments of the present disclosure, the bus may have a multilayer structure. Specifically, an example of the bus 1030 may include a multilayer AHB (Advanced High-performance Bus) or multilayer AXI (Advanced eXtensible Interface), but the present disclosure is not limited thereto.

FIG. 4 is a block diagram illustrating components of the display device 1100 of FIG. 3.

Referring to FIG. 4, the display device 1100 of the HMD 1000 according to the embodiments of the present disclosure includes a timing controller 100, a data driver 200, a gate driver 300 and a display panel 400.

The timing controller 100 receives RGB image signals, a clock signal MCLK and synchronization signals Hsync and Vsync for displaying the RGB image signals. The timing controller 100 outputs the compensated RGB image signals R', G' and B' to the data driver 200. The timing controller 100 generates a timing signal for controlling the data driver 200 and the gate driver 300, and outputs the timing signal to the data driver 200 and the gate driver 300.

The timing controller 100 transmits a data application signal DE, a horizontal synchronization start signal STH and a load signal LOAD to the data driver 200.

Specifically, the data application signal DE indicates a cycle of horizontal lines in an image signal. For example, when an image signal has a resolution of 1920×1080, the data application signal DE may be enabled 1080 times while one frame of image signal is outputted. However, the present disclosure is not limited thereto.

The data application signal DE is used for frame-shifting the image data inputted to the data driver 200. In embodiments of the present disclosure, however, the input timing of the image data inputted to the data driver 200 is maintained, but the data application signal DE may be shifted in order to shift the output screen of the image data. This configuration will be described later in more detail with reference to FIGS. 9 to 13.

The horizontal synchronization start signal STH may be used for converting data inputted to the data driver 200 into an analog value, and applying the analog value to the display panel 400. The load signal LOAD commands the data driver 200 to load a data signal.

The timing controller 100 outputs a gate clock signal Gate clock, a vertical synchronization start signal STV and a data enable signal OE to the gate driver 300. The gate clock signal Gate clock is used for setting the cycle of a gate-on signal applied to a gate line, the vertical synchronization start signal STV is used for commanding the start of the gate-on signal, and the data enable signal OE is used for enabling an output of the gate driver 300.

The timing controller 100 may compensate the RGB image signals R, G and B and transmits the compensated RGB image signals R', G' and B' to the data driver 200.

The data driver 200 receives the compensated RGB digital data R', G' and B' from the timing controller 100 and stores the received data therein. Then, when the load signal LOAD is applied, the data driver 200 selects voltages corresponding to the respective digital data, and transmits data signals V1 to Vn (not illustrated) to the display panel 400.

The gate driver 300 includes a shift register, a level shifter, a buffer and the like. The gate driver 300 receives the gate clock signal Gate clock and the vertical synchronization start signal STV from the timing controller 100, receives voltages Von, Voff and Vcom (not illustrated) from a gate driving voltage generator (not illustrated) or the timing controller 100, and turn on/off thin film transistors on the display panel 400 in order to apply pixel voltages to pixels or to block the pixel voltages.

The display panel 400 includes n data lines, m gate lines arranged perpendicular to the data lines, and a plurality of pixel regions arranged in a lattice shape between the data lines and the gate lines. The display panel 400 includes thin film transistors and pixel electrodes, the thin film transistors each having one end connected to the corresponding gate line, another end connected to the corresponding data line, and the other end connected to the corresponding pixel electrode. In the display panel 400, gate voltages G1 to Gn (not illustrated) provided from the gate driver 300 are applied to the corresponding pixel column. In this case, thin film transistors of the corresponding pixel column are enabled. Through the process, data voltages D1 to Dm (not illustrated) provided from the data driver 200 are applied to the corresponding pixel electrodes of the display panel 400.

Figure 5:
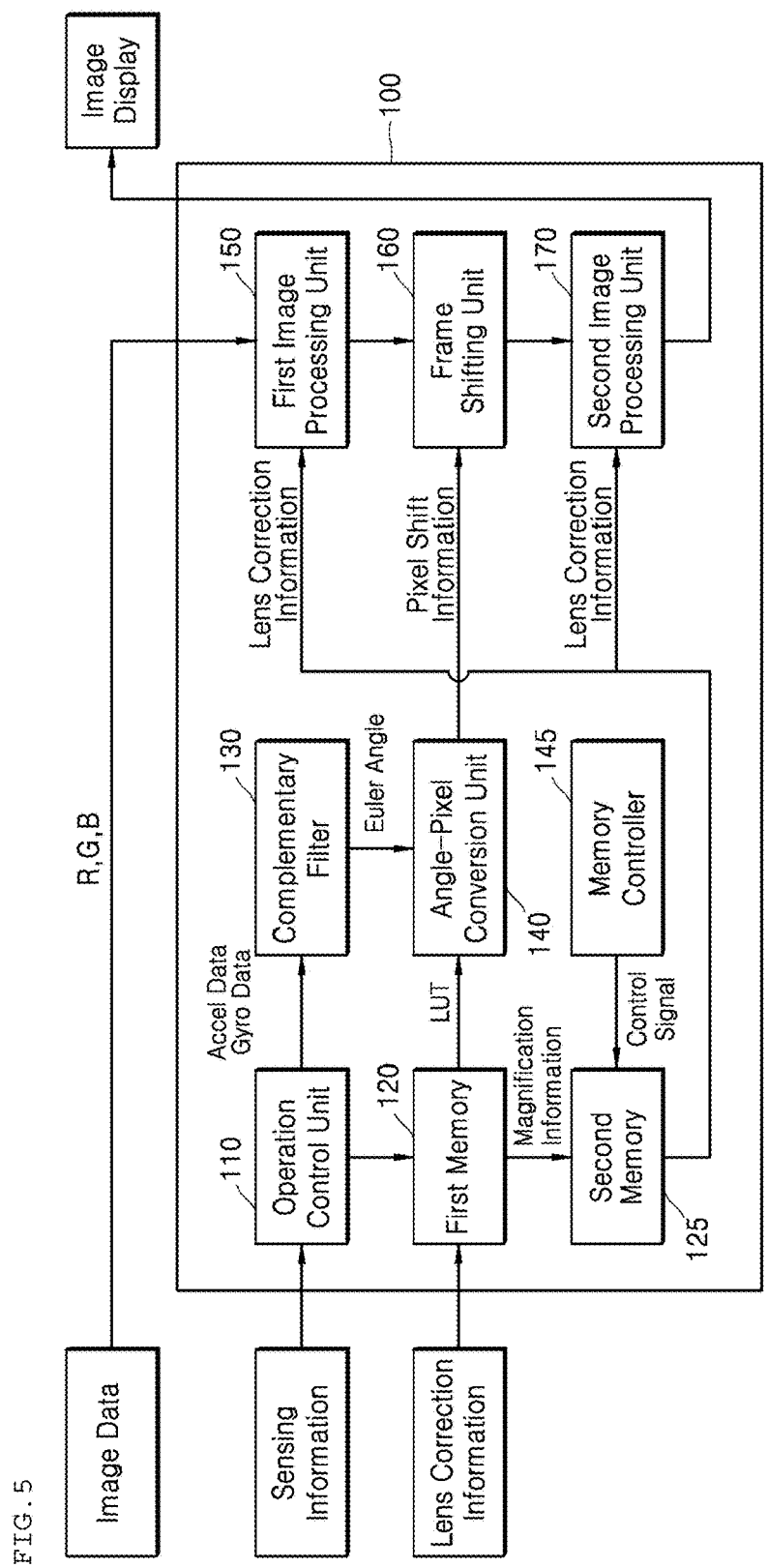
FIG. 5 is a block diagram illustrating components of a timing controller of the display device of FIG. 4.

FIG. 5 is a block diagram illustrating components of the timing controller of FIG. 4.

Referring to FIG. 5, the timing controller 100 according to the embodiments of the present disclosure includes an operation controller 110, a first memory 120, a second memory 125, a complementary filter 130, an angle-pixel conversion unit 140, a memory controller 145, a first image processing unit 150, a frame shifting unit 160 and a second image processing unit 170.

The operation controller 110 receives sensor information from the sensor 1300. The operation controller 110 generates or otherwise facilitates the generation of image data based on the received sensor information. For example, the operation controller 110 generates image data based on first sensing information measured by the sensor 1300 at the first time point.

The first memory 120 may receive lens correction information on a lens module coupled to the display panel 400, and store the lens correction information. The lens correction information may be used for distorting image data according to the optical structure of the lens or removing the distortion.

The distortion may include a distortion of a wide-angle lens, and may occur when an image is distorted while the perspective of the image is excessively exaggerated. However, the present disclosure is not limited thereto.

The first memory 120 may include a nonvolatile memory. The first memory 120 may store a lookup table LUT indicating the relation between angles and pixels, and provide the lookup table LUT to the angle-pixel conversion unit 140.

The second memory 125 may receive the lens correction information from the first memory 120. The lens correction information may include magnification information on the lens module coupled to the display panel 400.

The second memory 125 may include a volatile memory and serve as a high-speed cache memory. However, the present disclosure is not limited thereto.

The second memory 125 may receive a control signal from the memory controller 145, and transmit the control signal to the first and second image processing units 150 and 170.

The complementary filter 130 may receive the sensing information measured by the sensor 1300 from the operation controller 110, and convert the sensing information into an Euler angle. Specifically, the sensing information may include acceleration information measured by an acceleration sensor, data measured by a gyroscope sensor and data measured by a geomagnetic sensor.

The Euler angle indicates three angles for expressing the orientation of a rigid body rotating around a fixed point on the 3D space.

The angle-pixel conversion unit 140 receives the Euler angle from the complementary filter 130, and calculates pixel shift information based on the Euler angle. At this time, the angle-pixel conversion unit 140 may calculate the pixel shift information using the lookup table LUT received from the first memory 120.

The memory controller 145 may generate and provide a control signal for controlling the operation of the second memory 125. For example, the memory controller 145 may control the timing at which the lens correction information stored in the second memory 125 is inputted to the first and second image processing units 150 and 170. However, the present disclosure is not limited thereto.

The first image processing unit 150 may receive the lens correction information from the second memory 125, and receive image data for one frame. The first image processing unit 150 may remove distortion contained in the input image data based on the lens correction information.

The frame shifting unit 160 may receive the pixel shift information calculated by the angle-pixel conversion unit 140. The frame shifting unit 160 may generate a signal to frame-shift the image data which are received from the first image processing unit 150 and from which the distortion is removed, based on the pixel shift information.

At this time, the frame shifting unit 160 may shift the image data using a vector value of the pixel shift information which is calculated based on the first sensing information measured at the first time point and second sensing information measured at a second time point.

More specifically, the frame shifting unit 160 may frame-shift the image data outputted to the display panel 400 by shifting the data application signal DE that decides the output timing of the image data inputted to the data driver 200 of FIG. 4. The data application signal DE is transmitted to the data driver 200 from the timing controller 100. This configuration will be described later in more detail with reference to FIGS. 9 to 13.

The second image processing unit 170 may receive the lens correction information from the second memory 125, and receive the frame-shifted image data from the frame shifting unit 160. The second image processing unit 170 may apply a distortion to the input image data based on the lens correction information.

The second image processing unit 170 may transmit the distortion-applied image data to the data driver 200 of FIG. 4.

Figure 6:
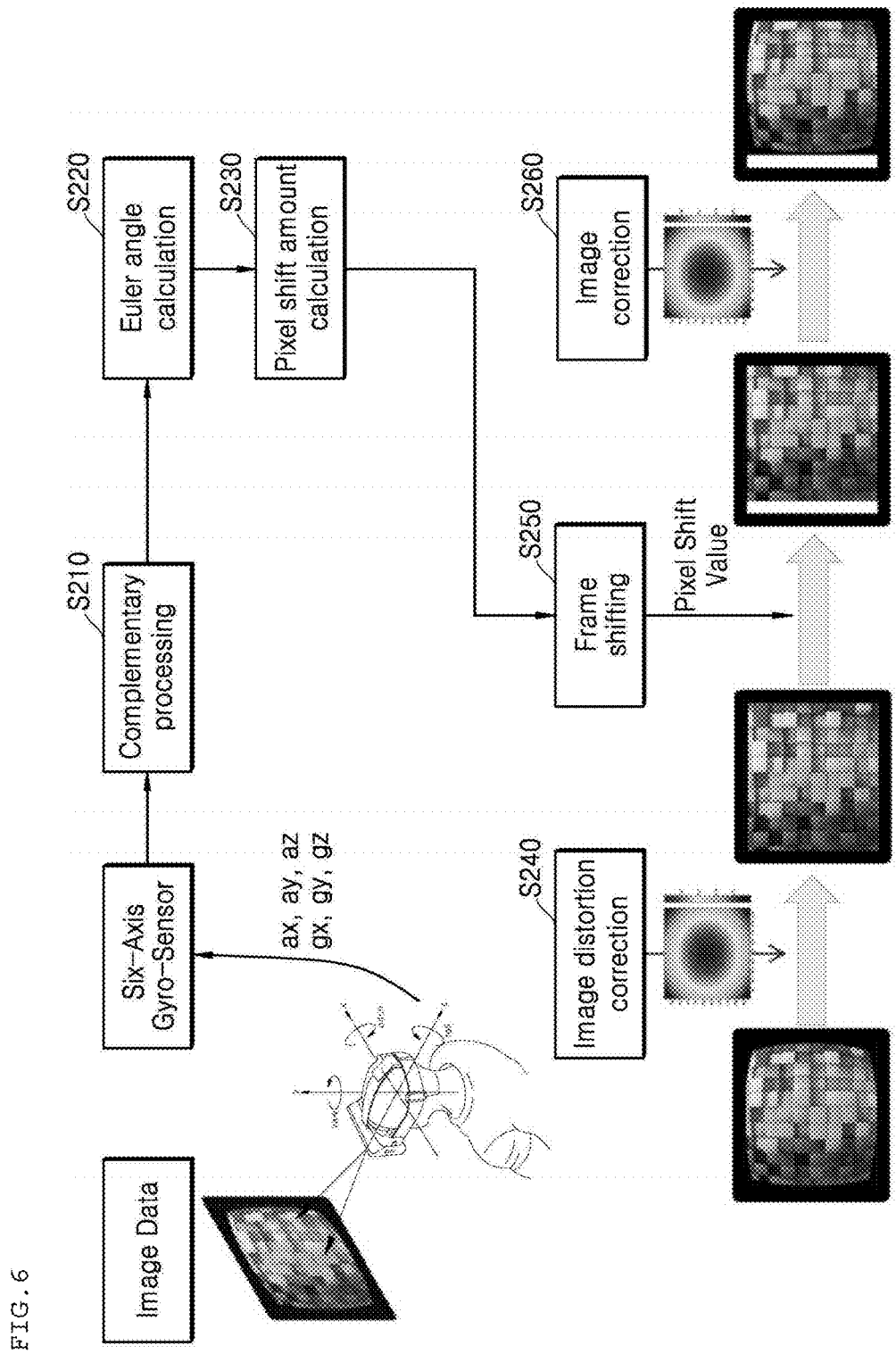
FIG. 6 is a block diagram for describing an operation of the HMD according to the embodiments of the present disclosure.

FIG. 6 is a block diagram illustrating the operation of the HMD according to the embodiments of the present disclosure.

Referring to FIG. 6, the HMD according to the embodiments of the present disclosure receives data measured by the sensor 1300, and complementarily processes the received data, at step S210. For example, the sensor 1300 may include a six-axis gyro-sensor, and sensing information measured by the six-axis gyro-sensor may contain data on ax, ay, az, gx, gy and gz-axes. However, the present disclosure is not limited thereto.

The complementary filter 130 converts the received sensing information into an Euler angle at step S220.

Then, the angle-pixel conversion unit 140 calculates pixel shift information based on the Euler angle at step S230. At this time, the angle-pixel conversion unit 140 may calculate the pixel shift information using the lookup table LUT received from the first memory 120.

Specifically, the angle-pixel conversion unit 140 calculates a pixel shift amount containing the vector value of the pixel shift information, based on first sensing information measured at a first time point and second sensing information measured at a second time point. The pixel shift information on the calculated pixel shift amount is transmitted to the frame shifting unit 160.

The first image processing unit 150 may remove distortion contained in input image data based on received lens correction information at step S240.

Then, the frame shifting unit 160 may generate a signal to frame-shift the image data received from the first image processing unit 150, based on the pixel shift information, at step S250. At this time, the frame shifting unit 160 may frame-shift the image data outputted to the display panel 400 by shifting the data application signal DE that decides the output timing of the image data inputted to the data driver 200 of FIG. 4.

Then, the second image processing unit 170 may apply a distortion to the input image data based on the lens correction information at step S260. Through this operation, a distortion of the optical lens may be applied to the frame-shifted image data, and the image data considering the second sensing information measured at the second time point may be outputted.

Figure 7:
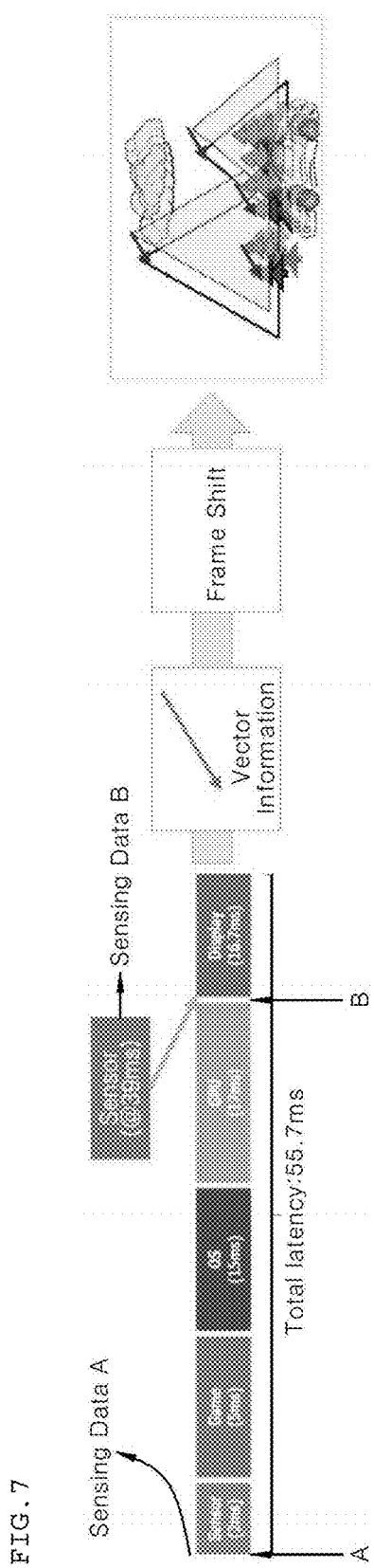
FIG. 7 is a block diagram for describing the operation of the HMD according to the embodiments of the present disclosure.
Figure 8:
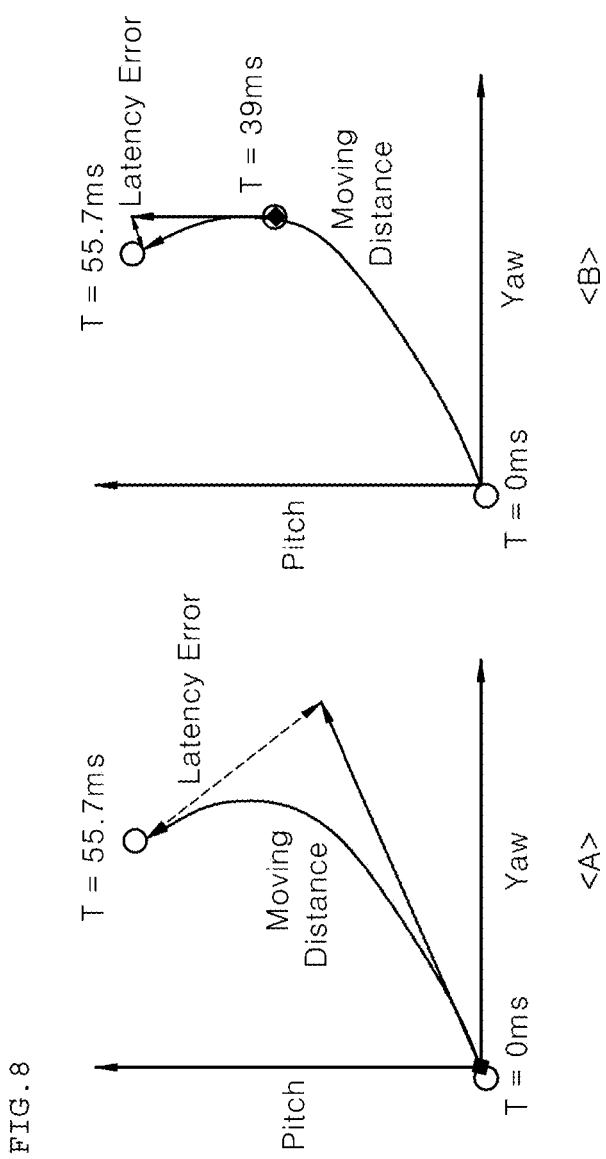
FIG. 8 is graphs for describing improvements of the HMD according to the embodiments of the present disclosure.

FIG. 7 is a block diagram for describing the operation of the HMD according to the embodiments of the present disclosure. FIG. 8 illustrates graphs for describing the improvements of the HMD according to the embodiments of the present disclosure.

Referring to FIG. 7, when new image data are calculated based on the first sensing information measured at the first time point A, the calculation consumes a time required by the sensor 1300 (for example, 2 ms), and for applications such as a game and OS (for example, 5 ms for the game and 15 ms for the OS), a time required for the GPU (for example, 17 ms) and a time required for display (for example, 16.7 ms). That is, a time required for completely displaying the new image data based on the first sensing information measured at the first time point A may be about 55.7 ms, and may set the motion-to-motion latency of the HMD.

The HMD according to the embodiments of the present disclosure calculates pixel shift information using the first sensing information measured at the first time point A and the second sensing information measured at the second time point B. At this time, the pixel shift information contains a pixel shift vector value.

Then, the HMD frame-shifts the image data using the pixel shift information.

<A> of FIG. 8 illustrates an operation of the conventional HMD which does not use the second sensing information. When the conventional HMD generates image data using only the first sensing information measured at the first time point A, a motion-to-motion latency of about 55.7 ms occurs.

On the other hand, <B> of FIG. 8 illustrates an operation of the HMD according to the embodiment of the present disclosure. When using the second sensing information measured at the second time point B, for example, a time point of 39 ms immediately before image data are outputted to the display panel after the image data were generated, the HMD can calculate a pixel shift vector of the image data. At this time, the second time point B may correspond to a time point immediately before the image data are outputted after the image data were generated, for example, a time point that occurs after 39 ms has elapsed from the first time point. As used herein, the term "immediately before" may include some range of time, such as within 2 ms, 1 ms, 0.5 ms or less. For example, in one or more embodiments, the second time point B may correspond to a time point that occurs within 1 ms or less from a time point at which the generated image data is output to the display.

Through this operation, the HMD according to the present embodiment can improve a considerable portion of the latency error. That is, the HMD according to the present embodiment can display image data on the screen, the image data having only a motion-to-motion latency of about 16.7 ms, for example, which is required for the display.

By reducing the motion-to-motion latency, the HMD can secure high response, and implement a more natural VR screen. Furthermore, when a user experiences a VR program using the HMD, the HMD can reduce sim sickness which the user may feel.

Figure 9:
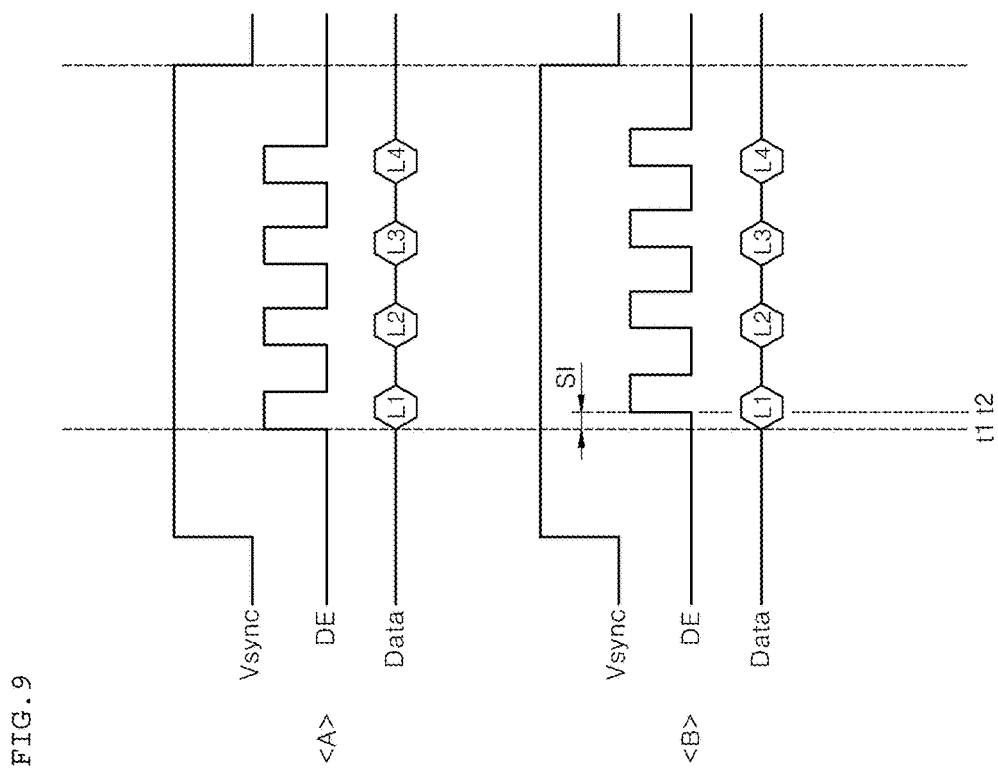

FIGS. 9 and 10 are timing diagrams and photographs for describing the operation of HMD according to the embodiment of the present disclosure.

<A> and <B> of FIG. 9 illustrate the synchronization signal Vsync, the data application signal DE and the data signal DATA which are used for the operation of the HMD according to the embodiment of the present disclosure.

At this time, the data application signal DE is generated within a margin between the back porch and the front porch in the synchronous system Vsync. However, the present disclosure is not limited thereto.

Each clock of the data application signal DE is used for outputting one horizontal line of image data. For example, a first horizontal line L1 of the image data is outputted at the first clock of the data application signal DE, and a second horizontal line L2 of the image data is outputted at the second clock of the data application signal DE.

Referring to <A> of FIG. 9, the start points of the data application signal DE and the data signal DATA are equal to each other. For example, the data application signal DE and the data signal DATA may be started at a first time point t1. Therefore, referring to FIG. 10A, the image data are outputted on the display panel without a loss.

Referring to <B> of FIG. 9, however, the start points of the data application signal DE and the data signal DATA are different from each other. The data application signal DE may be shifted in a unit clock of the data signal DATA. In this case, the image data outputted on the display panel may be frame-shifted to the left or right.

For example, the data signal DATA may be started at the first time point t1, and the data application signal DE may be started at the second time point t2. At this time, referring to <B> of FIG. 10, the image data may be frame-shifted to the left, and a space S1 may correspond to a difference between the first and second time points t1 and t2. However, the present disclosure is not limited thereto. As the data application signal DE is shifted to the left or right in a unit clock while the data signal DATA is fixed, the output image data may also be frame-shifted to the left or right.

Figure 11:
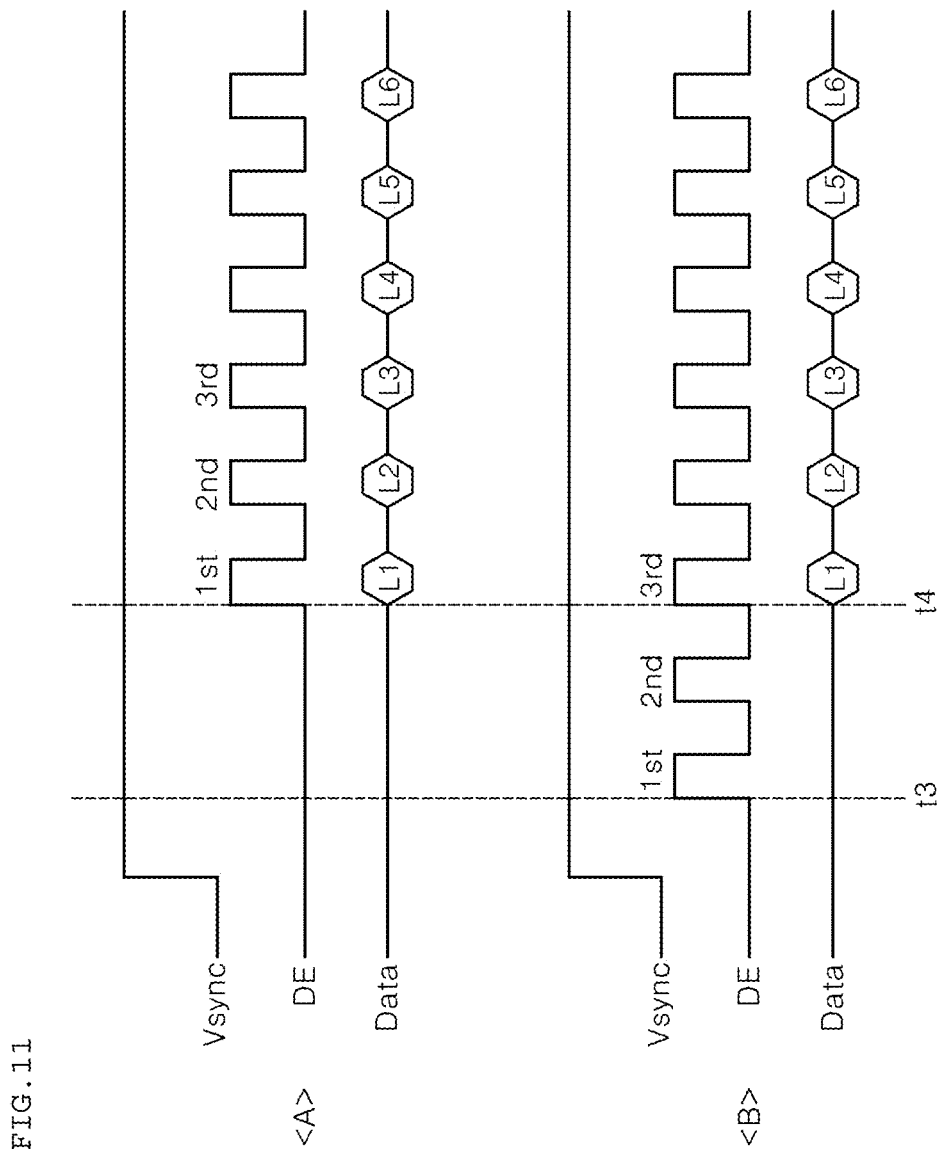

FIGS. 11 and 12 are timing diagrams and photographs for describing an operation of an HMD according to another embodiment of the present disclosure. For convenience of description, the duplicated descriptions for the same components as those of the above-described embodiment are omitted herein, and the following descriptions will be focused on differences therebetween.

<A> and <B> of FIG. 11 illustrate the synchronization signal Vsync, the data application signal DE and the data signal DATA which are used for an operation of the HMD according to the embodiment of the present disclosure.

Referring to <A> of FIG. 11, the start points of the data application signal DE and the data signal DATA are equal to each other. For example, the data application signal DE and the data signal DATA may be started at the first time point t1. Therefore, referring to <A> of FIG. 12, the image data are outputted on the display panel without a loss.

Referring to <B> of FIG. 12, however, the start points of the data application signal DE and the data signal DATA are different from each other. The data application signal DE may be shifted by one or more unit clocks of the data signal DATA. In this case, however, a rising edge of the data application signal DE may coincide with a rising edge of the data signal DATA. Furthermore, image data outputted on the display panel may be frame-shifted upward or downward.

For example, the data application signal DE may be started at a third time point t3, and the data signal DATA may be started at a fourth time point t4. At this time, referring to <B> of FIG. 12, the image data may be frame-shifted downward. However, the present disclosure is not limited thereto. As the data application signal DE is shifted to the left or right by one or more unit clocks in synchronization with the data signal DATA while the data signal DATA is fixed, the output image data may be frame-shifted upward or downward.

FIG. 13 is photographs for describing an operation of an HMD according to still another embodiment of the present disclosure. For convenience of descriptions, the duplicated descriptions for the same components as those of the above-described embodiment are omitted herein, and the following descriptions will be focused on differences therebetween.

<A> and <B> of FIG. 13 are photographs for describing an operation of the HMD according to the embodiment of the present disclosure. Referring to <A> and <B> of FIG. 13, the size R of the image data which are inputted to the HMD may be larger than the size P of the image displayed on the display panel.

Although not clearly shown in the drawings, the image data may be frame-shifted to the left or right or frame-shifted upward or downward, as the data application signal DE is shifted. However, since the size R of the input image data is larger than the size P of the image displayed on the display panel, an image displayed on the display panel may be cut or not be processed in black color, even though the image data are frame-shifted. However, the present disclosure is not limited thereto.

In other words, the HMD according to the embodiments of the present disclosure can frame-shift the output image data by shifting the data application signal DE. Through this operation, the HMD can reduce the motion-to-motion latency required for displaying a screen using the existing components, thereby not only reducing a cost required for reducing the motion-to-motion latency, but also improving the operation performance.

According to the embodiments of the present disclosure, the HMD can generate image data using the first sensing information measured at the first time point, and frame-shift the image data using the second sensing information measured at the second time point immediately before the image data is outputted to the display panel, thereby reducing a latency error of the output image data. Through this operation, the HMD can secure high response.

Furthermore, the HMD can output a VR screen having a short motion-to-motion latency, thereby implementing a more natural VR screen. When a VR program is executed, the HMD can reduce sim sickness that a user may feel.

Furthermore, since the HMD can reduce a motion-to-motion latency using the existing components, the operation performance can be improved without increasing the manufacturing cost.

While various embodiments have been described above, it will be understood to those skilled in the art that the embodiments described are by way of example only. Accordingly, the disclosure described herein should not be limited based on the described embodiments.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A head mounted display (HMD), comprising:
a sensor configured to sense a motion of the HMD;
a controller configured to generate image data based on first sensing information acquired by the sensor at a first time point; and
a display device configured to receive the generated image data as input image data and to frame-shift the input image data, and output the frame-shifted image data to a display panel, and
wherein the display device frame-shifts the image data based on second sensing information acquired by the sensor at a second time point after the first time point,
wherein the display device comprises a complementary filter configured to convert the first and second sensing information into an Euler angle, and an angle-pixel conversion unit configured to calculate pixel shift information based on the Euler angle.

2. The HMD of claim 1, wherein the second time point corresponds to a point in time that occurs within 1 ms before a time the controller outputs the image data to the display panel after generating the image data.

3. The HMD of claim 1, wherein the display device comprises:
a first image processing unit configured to remove distortion contained in the input image data, based on lens correction information, and to output first processed image data;
a frame shifting unit configured to receive the first processed image data and to generate a signal for frame-shifting the first processed image data outputted from the first image processing unit, based on the pixel shift information, the frame shifting unit configured to output frame-shifted image data; and
a second image processing unit configured to apply distortion to the image data outputted from the frame shifting unit, based on the lens correction information.

4. The HMD of claim 3, wherein the frame shifting unit frame-shifts the first processed image data using a vector value of the pixel shift information which is calculated based on the first and second sensing information.

5. The HMD of claim 1, wherein the display panel comprises data lines and gate lines which cross each other, and
the display device comprises:
a data driver configured to convert the input image data into data voltages and output the data voltages to the data lines;
a gate driver configured to sequentially output gate pulses synchronized with the data voltages to the gate lines; and
a timing controller configured to compensate for the image data inputted to the data driver, and control an output timing,
wherein the timing controller frame-shifts the image data outputted to the display panel by shifting a data application signal that determines the output timing of the image data inputted to the data driver.

6. The HMD of claim 5, wherein when the data application signal is shifted within a unit clock of the image data inputted to the data driver, the image data outputted to the display panel is frame-shifted to the left or right.

7. The HMD of claim 5, wherein when the data application signal is shifted by one or more unit clocks of the image data inputted to the data driver, the image data outputted to the display panel is frame-shifted upward or downward.

8. The HMD of claim 1, wherein a time interval between the second time point and the first time point is equal to a time required for the controller to generate one image frame based on the first sensing information.

9. A method for control an HMD, comprising:
measuring a motion of the HMD at a first time point;
generating image data based on first sensing information measured at the first time point;
measuring a motion of the HMD at a second time point after the first time point;
generating frame-shifted image data by frame-shifting the image data based on second sensing information measured at the second time point; and
outputting the frame-shifted image data to a display panel,
wherein the generating the frame-shifted image data comprises converting the fast and second sensing information into an Euler angle, and calculating pixel shift information based on the Euler angle.

10. The method of claim 9, wherein the second time point corresponds to a point in time that occurs within 1 ms before a time the frame-shifted image data is output to the display panel.

11. The method of claim 9, wherein generating the frame-shifted image data comprises:
removing distortion contained in the image data based on lens correction information;
frame-shifting the image data from which the distortion is removed, based on the pixel shift information; and
applying distortion to the frame-shifted image data based on the lens correction information.

12. The method of claim 11, wherein frame-shifting the image data based on the pixel shift information comprises frame-shifting a position of the image data outputted to the display panel using a vector value of the pixel shift information which is calculated based on the first and second sensing information.

13. The method of claim 11, wherein the display panel comprises data lines and gate lines which cross each other, and
the outputting of the frame-shifted image data to the display panel comprises:
converting the input image data into data voltages and outputting the data voltages to the data lines;
sequentially outputting gate pulses synchronized with the data voltages to the gate lines; and
compensating for the image data, and controlling an output timing,
wherein the controlling of the output timing comprises frame-shifting the image data outputted to the display panel by shifting a data application signal that determines the output timing of the input image data.

14. The method of claim 13, wherein when the data application signal is shifted within a unit clock of the input image data, the image data outputted to the display panel is frame-shifted to the left or right.

15. The method of claim 13, wherein when the data application signal is shifted by one or more unit clocks of the input image data, the image data outputted to the display panel is frame-shifted upward or downward.

16. The method of claim 9, wherein a time interval between the second time point and the first time point is equal to a time required for generating one image frame based on the first sensing information.

* * * * *